(12) United States Patent
Roh et al.

(10) Patent No.: US 9,379,778 B2
(45) Date of Patent: Jun. 28, 2016

(54) NEAR FIELD COMMUNICATION CIRCUIT AND OPERATING METHOD OF THE SAME

(71) Applicant: Samsung Electronics Co., Ltd., Samsung-ro, Yeongtong-gu, Suwon-si (KR)

(72) Inventors: Hyoung Hwan Roh, Seoul (KR); Il Jong Song, Yongin-si (KR); Chol Su Yoon, Yongin-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 130 days.

(21) Appl. No.: 13/960,787

(22) Filed: Aug. 6, 2013

(65) Prior Publication Data

US 2014/0045425 A1 Feb. 13, 2014

(30) Foreign Application Priority Data

Aug. 7, 2012 (KR) ................. 10-2012-0086416

(51) Int. Cl.
*H04B 5/00* (2006.01)
*G06K 19/07* (2006.01)

(52) U.S. Cl.
CPC .......... *H04B 5/0012* (2013.01); *G06K 19/0726* (2013.01); *H04B 5/0056* (2013.01); *H04B 5/0031* (2013.01)

(58) Field of Classification Search
CPC ............. H04B 5/0025; G06K 19/0726; G06K 7/10148; G06K 7/10237
See application file for complete search history.

(56) References Cited

U.S. PATENT DOCUMENTS

| | | | | |
|---|---|---|---|---|
| 6,088,741 A * | 7/2000 | Murata | ................ | G06K 7/0008 710/20 |
| 6,356,198 B1 | 3/2002 | Wuidart et al. | | |
| 7,304,577 B2 | 12/2007 | Waldner et al. | | |
| 7,880,588 B2 | 2/2011 | Enguent | | |
| 2005/0029351 A1 * | 2/2005 | Yoshinaga | ........... | G06K 7/0008 235/451 |
| 2005/0048949 A1 * | 3/2005 | Uchida | ............. | G06K 7/10336 455/407 |
| 2005/0127190 A1 * | 6/2005 | Arisawa | ............... | G06K 7/0008 235/492 |
| 2006/0131413 A1 * | 6/2006 | Morita | ................. | G06K 7/0004 235/451 |
| 2007/0246546 A1 * | 10/2007 | Yoshida | ........................ | 235/492 |
| 2008/0030307 A1 | 2/2008 | Chen | | |
| 2008/0280648 A1 * | 11/2008 | Miyagawa | ........... | G06K 7/0008 455/558 |
| 2009/0184805 A1 * | 7/2009 | Yamada | .................... | H04Q 9/00 340/10.51 |
| 2009/0251291 A1 * | 10/2009 | Borcherding | ...... | G06K 7/10128 340/10.1 |
| 2009/0295543 A1 * | 12/2009 | Kita | .................... | G06K 19/0723 340/10.1 |
| 2009/0308937 A1 * | 12/2009 | Yagi et al. | ...................... | 235/492 |
| 2010/0001839 A1 * | 1/2010 | Uchiyama et al. | ........... | 340/10.1 |
| 2010/0134256 A1 * | 6/2010 | Mihota | .................. | H04B 3/142 340/10.1 |
| 2011/0127951 A1 * | 6/2011 | Walley | .................... | H02J 5/005 320/108 |
| 2011/0226853 A1 * | 9/2011 | Soh et al. | ........................ | 235/380 |
| 2012/0044058 A1 * | 2/2012 | Shiotsu | .............. | G06K 7/10425 340/10.5 |

FOREIGN PATENT DOCUMENTS

| | | |
|---|---|---|
| JP | 2009-094681 | 4/2009 |
| JP | 4536496 | 9/2010 |
| KR | 10-2008-0074219 A | 8/2008 |
| KR | 10-1052115 | 7/2011 |
| KR | 10-2011-0127041 A | 11/2011 |
| KR | 10-1094440 | 12/2011 |

* cited by examiner

*Primary Examiner* — Cindy Trandai
(74) *Attorney, Agent, or Firm* — Muir Patent Law, PLLC

(57) ABSTRACT

The near field communication (NFC) circuit includes an NFC reader circuit configured to communicate with an outside through an antenna, a resonant and matching circuit connected between the NFC reader circuit and the antenna, an NFC card circuit connected to nodes and configured to communicate with the outside through the antenna, and a processor configured to output a plurality of control signals when the NFC reader circuit is enabled, wherein the NFC card circuit is configured to control a resonant frequency of the antenna in response to the plurality of control signals.

20 Claims, 6 Drawing Sheets

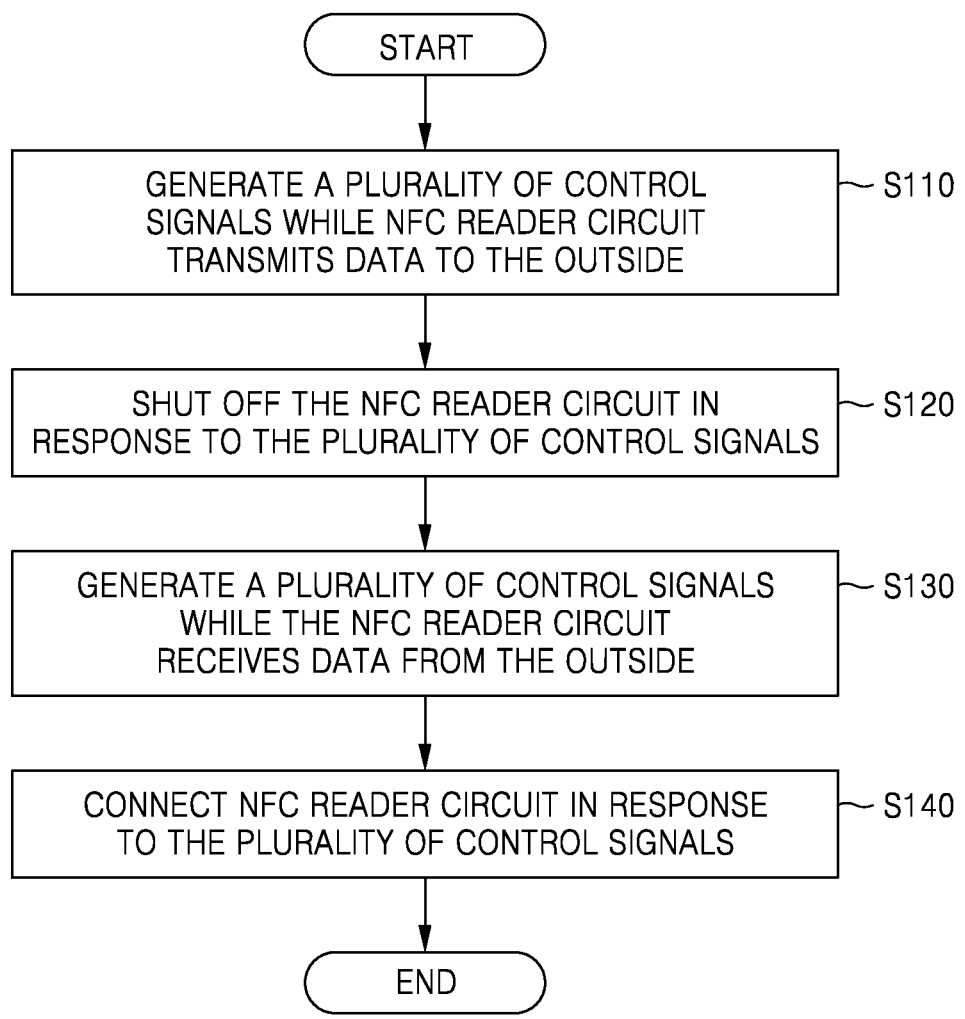

NEAR FIELD COMMUNICATION CIRCUIT AND OPERATING METHOD OF THE SAME

CROSS-REFERENCE TO RELATED APPLICATIONS

This application claims priority under 35 U.S.C. §119(a) to Korean Patent Application No. 10-2012-0086416 filed on Aug. 7, 2012, the disclosure of which is hereby incorporated by reference in its entirety.

BACKGROUND

This disclosure relates to near field communication (NFC), and more particularly, to an NFC circuit including an NFC reader circuit and an NFC card circuit and a method for operating the same.

Near field communication (NFC) is a type of radio frequency identification (RFID) technology and a contactless communication technology that generally uses a 13.56 MHz frequency bandwidth. NFC applications are often low cost, and may have short communication distance, thereby having relatively high security.

Existing NFC circuits include an NFC reader circuit and an NFC card circuit. The NFC reader circuit is an NFC reader for communicating with the outside, and the NFC card circuit is an NFC card (or tag) for communicating with outside. When an NFC circuit operates as the NFC reader, for example, the NFC reader circuit is enabled and the NFC card circuit is disabled, a leakage current output from the NFC reader circuit may be applied to the NFC card circuit. The leakage current may damage the NFC card circuit.

Also, a resonant frequency when transmitting data and a resonant frequency when receiving data are generally the same in the typical NFC circuit. As a result, if a coupling factor with the outside, for example, with the other NFC circuit is large, the impedance of an antenna is reduced, thereby reducing communication efficiency.

SUMMARY

In one embodiment, a near field communication (NFC) circuit includes an NFC reader circuit configured to communicate with an outside through an antenna, a resonance and matching circuit coupled between the NFC reader circuit and nodes of the antenna, an NFC card circuit coupled to the nodes and configured to communicate with the outside through the antenna, and a processor configured to output a plurality of control signals when the NFC reader circuit is enabled. The NFC card circuit controls a resonant frequency of the antenna in response to the plurality of control signals.

In one embodiment, the NFC card circuit includes a signal processing circuit configured to rectify a signal received through the antenna and demodulate the rectified received signal, and a load modulation circuit configured to control a resistance value in response to the plurality control signals when the NFC reader circuit is enabled.

The load modulation circuit may shut off connection between the signal processing circuit and the nodes when the NFC reader circuit transmits data to the outside and may connect the signal processing circuit and the nodes when the NFC reader circuit receives data from the outside.

In one embodiment, the load modulation circuit includes a plurality of resistance control circuits controlling a resistance value in response to the plurality of control signals, respectively.

In one embodiment, each of the plurality of resistance control circuits includes a plurality of resistance circuits which are connected between a corresponding node among the nodes and a ground in parallel with each other and are switched in response to the plurality of control signals, respectively.

In one embodiment, the NFC card circuit, the NFC reader circuit, and the processor are embodied in one chip.

In one embodiment, an electronic device includes the NFC circuit and a central processing unit (CPU) configured to control an operation of the NFC circuit.

In one embodiment, controlling the resonant frequency includes changing the resonant frequency by a first amount in response to a first setting of the plurality of control signals, and changing the resonant frequency by a second amount different from the first amount in response to a second setting of the plurality of control signals.

In one embodiment, a method for operating a near field communication (NFC) circuit including an NFC reader circuit and an NFC card circuit is disclosed. The method includes generating a plurality of control signals while the NFC reader circuit being enabled, and selectively controlling a resonant frequency of an antenna in response to the plurality of control signals.

In one embodiment, selectively controlling the resonant frequency includes changing the resonant frequency by a first amount in response to a first setting of the plurality of control signals, and changing the resonant frequency by a second amount different from the first amount in response to a second setting of the plurality of control signals.

In one embodiment, selectively controlling the resonant frequency includes changing the resonant frequency by a first amount when the NFC reader circuit transmits data to the outside and changing the resonant frequency by a second amount different from the first amount when the NFC reader circuit receives data from the outside.

In one embodiment, selectively controlling the resonant frequency includes shutting off connection between the antenna and the NFC card circuit when the NFC reader circuit transmits data and connecting the antenna and the NFC card circuit when the NFC reader circuit receives data.

In one embodiment, controlling the resonant frequency includes controlling a resistance value associated with the NFC card circuit in response to the plurality of control signals.

In one embodiment, a near-field communication (NFC) circuit includes an antenna, an NFC reader circuit coupled to the antenna, an NFC card circuit coupled to the antenna, a processor, and a control circuit configured to receive a control signal from the processor and to adjust a resonant frequency of the antenna in response to the control signal.

In one embodiment, the NFC reader circuit is coupled to the antenna through resonance circuit and a matching circuit, and the NFC card circuit is coupled to the antenna through a first and second line, the first line coupled to a first capacitor, and the second line coupled to a second capacitor.

In one embodiment, the control circuit includes a plurality of switches configured to disconnect part of the NFC card circuit from the antenna. The plurality of switches may be connected to receive the control signal and to disconnect part of the NFC card circuit from the antenna in response to the control signal.

In one embodiment, the NFC card circuit, the NFC reader circuit, and the processor are embodied in one chip.

In one embodiment, the control circuit is configured to adjust the resonant frequency by a first amount in response to a first setting of the control signal, and to adjust the resonant frequency by a second amount different from the first amount in response to a second setting of the control signal.

BRIEF DESCRIPTION OF THE DRAWINGS

FIG. 6 is a flow chart for explaining an exemplary method for operating the NFC circuit shown in FIG. 1, according to one embodiment.

DETAILED DESCRIPTION

Figure 1:
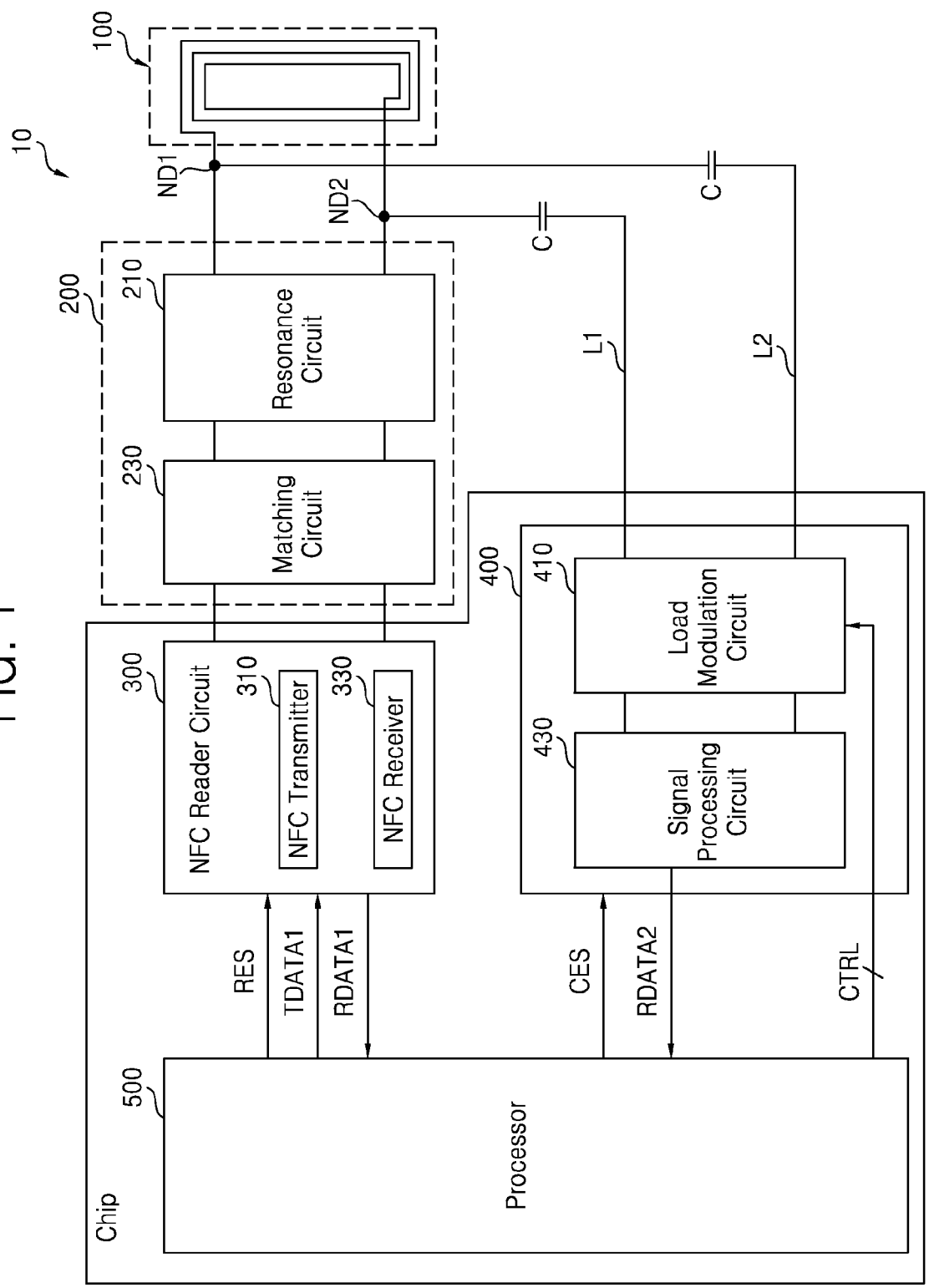
FIG. 1 is a schematic block diagram of a near field communication (NFC) circuit according to an exemplary embodiment.

The present disclosure now will be described more fully hereinafter with reference to the accompanying drawings, in which various embodiments are shown. The invention may, however, be embodied in many different forms and should not be construed as limited to the embodiments set forth herein. In the drawings, the size and relative sizes of elements may be exaggerated for clarity. Like numbers refer to like elements throughout.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first circuit could be termed a circuit chip, and, similarly, a second circuit could be termed a first circuit without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of a near field communication (NFC) circuit according to an exemplary embodiment. Referring to FIG. 1, the NFC circuit 10 includes an antenna 100, a resonance and matching circuit 200, an NFC reader circuit 300, an NFC card circuit 400, and a processor 500. The different elements are configured to perform certain processes.

The antenna 100 converts a radio signal received from the outside into an electric signal and outputs the converted electric signal to the NFC reader circuit 300 or the NFC card circuit 400. The antenna 100 also converts an electric signal output from the NFC reader circuit 300 or the NFC card circuit 400 into radio signal and outputs the radio signal into the outside.

The resonant and matching circuit 200 controls a resonant frequency of the antenna 100 and matches the impedance of the NFC reader circuit 300 side and the impedance of the antenna 100 side to increase communication efficiency of the NFC circuit 10. In one embodiment, the resonance and matching circuit 200 includes a resonance circuit 210 and a matching circuit 230. The resonance circuit 210 controls the resonant frequency of the antenna 100. For example, the resonance circuit 210 may include a capacitor. The matching circuit 230 matches the impedance of the NFC reader circuit 300 side and the impedance of the antenna 100 side.

The NFC reader circuit 300 communicates with the outside, for example, the outside NFC reader or NFC tag, as an NFC reader, while receiving a reader enable signal (RES) from the processor 500. In one embodiment, the NFC reader circuit 300 includes an NFC transmitter 310 and an NFC receiver 330.

The NFC transmitter 310 modulates transmission data TDATA1 output from the processor 500 and outputs the modulated transmission data TDATA1 as a radio signal through the antenna 100. The NFC receiver 330 demodulates a radio signal received through the antenna 100 and outputs the demodulated radio signal as received demodulated data RDATA1 to the signal processing circuit 500

The NFC card circuit 400 may be connected to nodes ND1 and ND2 of the antenna 100. In one embodiment, capacitors C are connected between the nodes ND1 and ND2 and the NFC card circuit 400. The NFC card circuit 400 may communicate with an outside, for example, an outside NFC reader, as an NFC card, for example an NFC tag, through the antenna 100 while receiving a card enable signal CES from the processor 500.

The NFC card circuit 400 controls a resonant frequency of the NFC circuit 10, for example a resonant frequency of the antenna 100 in response to a plurality of control signals CTRL output from the processor 500 while the NFC reader circuit 300 being enabled. As such, in one embodiment, the resonance circuit 210 and NFC card circuit 400 together control the resonant frequency of the antenna 100. The resonance circuit 210 may include elements (e.g., a capacitor) that sets a resonant frequency to a particular value, and the NFC card circuit 400 may allow for further adjustments of the resonant frequency, as discussed further below.

In one embodiment, the NFC card circuit 400 controls a resonance frequency of the antenna 100 by connecting or disconnecting lines L1 and L2 from a signal processing circuit 430 in response to the plurality of control signals CTRL. For example, the NFC card circuit 400 may control the resonant frequency of the antenna 100 by controlling a resistance value associated with the NFC card circuit 400 in response to the plurality of control signals CTRL.

In one embodiment, the NFC card circuit 400 includes a load modulation circuit 410 and a signal processing circuit 430. The load modulation circuit 410 modulates data to be transmitted outside through the antenna 100 in response to the plurality of control signals CTRL output from the processor 500 while the NFC card circuit 400 is enabled. The load modulation circuit 410 controls a resonant frequency of the antenna 100 by controlling a resistance value associated with the load modulation circuit 410 in response to the plurality of control signals CTRL output from the processor 500 while the NFC reader circuit 300 is enabled.

As a resistance value of the load modulation circuit 410 is controlled, a resonant frequency of the antenna 100 while the NFC card circuit 400 is enabled and a resonant frequency of the antenna 100 while the NFC reader circuit 300 is enabled may be different. As such, the resonant frequency of the antenna 100 may be selectively controlled.

Figure 2:
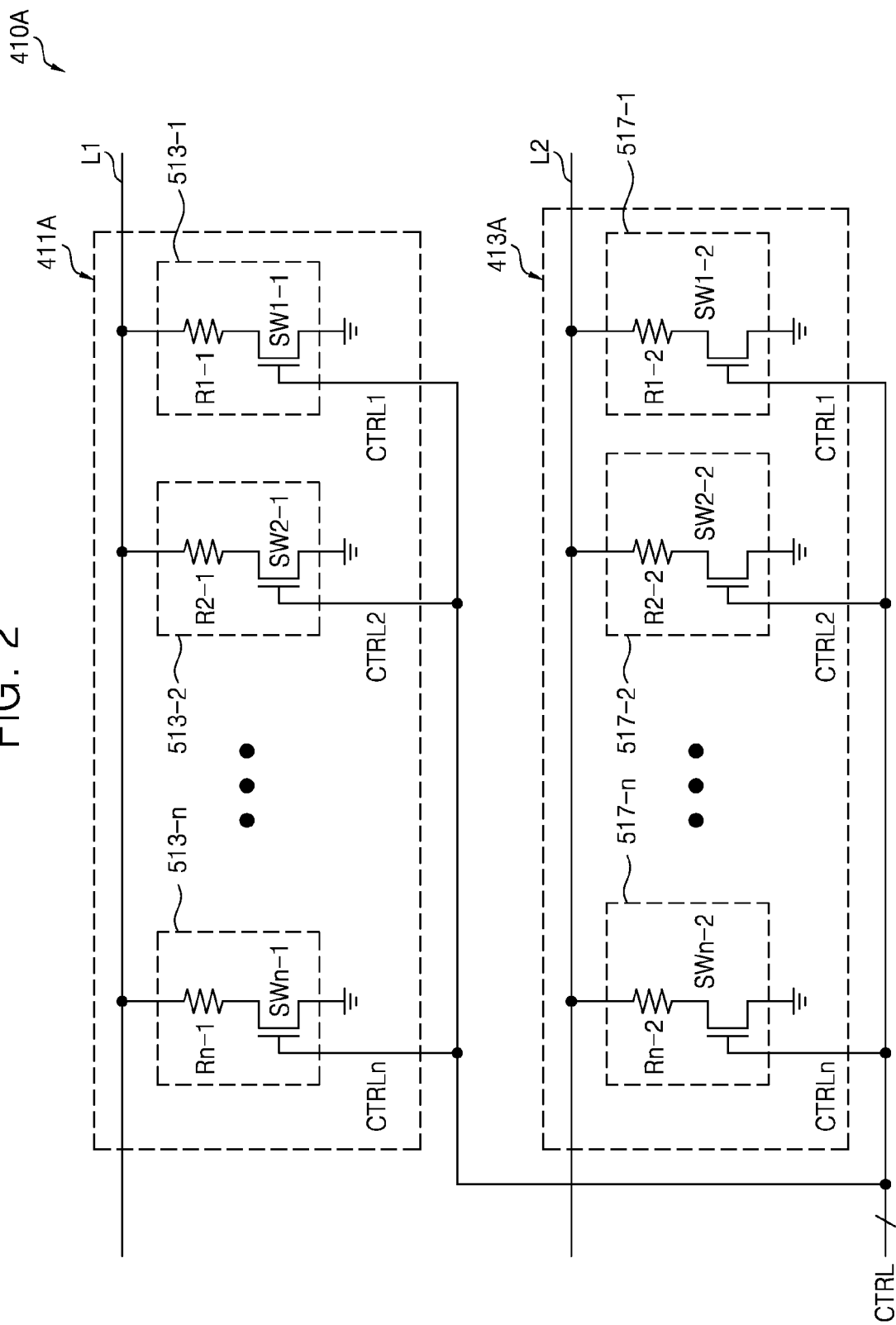
FIG. 2 is an exemplary embodiment of a circuit diagram of a load modulation circuit shown in FIG. 1.

FIG. 2 is an exemplary embodiment of a circuit diagram of the load modulation circuit shown in FIG. 1, according to one exemplary embodiment. Referring to FIGS. 1 and 2, the load modulation circuit 410A includes a first resistance control circuit 411A and a second resistance control circuit 413A. The first resistance control circuit 411A is connected to a first line L1. The first resistance control circuit 411A may control a resistance value in response to a plurality of control signals CTRL output from the processor 500.

The first resistance control circuit 411A includes a plurality of resistance (or resistor) circuits 513-1~513-$n$ connected between the first line L1 and a ground in parallel with each other. Each of the resistance circuits 513-1~513-$n$ is switched in response to a corresponding control signal among the plurality of control signals CTRL1~CTRLn (hereinafter collectively CTRL) output from the processor 500. Though a plurality of control signals CTRL1~CTRLn are shown, the amount shown are not intended to be limiting. One or more control signals and one or more respective resistance control circuits could be used to adjust the resonant frequency of the antenna. Although the different signals CTRL1~CTRLn, are each described above as separate signals, the multiple signals that form the control signals CTRL may be referred to herein simply as a control signal (e.g., for controlling the resonant frequency of the antenna 100).

In one embodiment, each of the resistance circuits 513-1~513-$n$ includes a resistor R1-1~Rn-1 and a switch SW1-1~SWn-1 that are connected between the first line L1 and the ground in series. Each switch SW1-1~SWn-1 is switched in response to a corresponding control signal among the plurality of control signals CTRL output from the processor 500. For example, each switch may be a transistor.

The resistance circuit 513-1 includes a resistor R1-1 and a switch SW1-1 connected between the first line L1 and the ground in series. The switch SW1-1 is switched in response to a corresponding control signal CTRL1 among the plurality of control signals CTRL output from the processor 500.

The resistance circuit 513-2 includes a resistor R2-1 and a switch SW2-1 connected between the first line L1 and the ground in series. The switch SW2-1 is switched in response to the corresponding control signal CTRL2 among the plurality of control signals CTRL output from the processor 500.

The last resistance circuit 513-$n$ includes a resistor Rn-1 and a switch SWn-1 connected between the first line L1 and the ground in series. The switch SWn-1 is switched in response to the corresponding control signal CTRLn among the plurality of control signals output from the processor 500.

According to exemplary embodiments, a resistance value of each of the resistor R1-1~Rn-1 included in each of the plurality of the resistance circuits 513-1~513-$n$ may be identical. According to exemplary embodiments, a resistance value of each of the resistance R1-1~Rn-1 included in each of the plurality of first resistance circuits 513-1~513-$n$ may be differently weighted.

In one embodiment, the second resistance control circuit 413A is connected to the second line L2. The second resistance control circuit 413A controls a resistance value in response to the plurality of control signals CTRL output from the processor 500.

The second resistance control circuit 413A includes a plurality of resistance circuits 517-1~517-$n$ connected between the second line L2 and a ground in parallel. Each of the resistance circuits 517-1~517-$n$ is switched in response to a corresponding control signal among the plurality of control signals CTRL output from the processor 500.

Each of the resistance circuits 517-1~517-$n$ includes a resistor R1-2~Rn-2 and a switch SW1-2~SWn-2 connected between the second line L2 and the ground in series. Each switch SW1-2~SWn-2 is switched in response to a corresponding control signal among the plurality of control signals CTRL output from the processor 500.

The resistance circuit 517-1 includes a resistor R1-2 and a switch SW1-2 connected between the second line L2 and the ground in series. The switch SW1-2 is switched in response to a corresponding control signal CTRL1 among the plurality of control signals CTRL output from the processor 500.

The resistance circuit 517-2 includes a resistor R2-2 and a switch SW2-2 connected between the second line L2 and the ground in series. The switch SW2-2 is switched in response to the corresponding control signal CTRL2 among the plurality of control signals CTRL output from the processor 500.

The last resistance circuit 517-$n$ includes a resistor Rn-2 and a switch SWn-2 connected between the second line L2 and the ground in series. The switch SWn-2 is switched in response to a corresponding control signal CTRLn among the plurality of control signals CTRL output from the processor 500.

The resistance value of each of the resistors R1-1~Rn-1 included in the plurality of the resistance circuits 513-1~513-$n$ of the first resistance control circuit 411A and the resistance value of each of the resistors R1-2~Rn-2 included in the plurality of the second resistance circuits 517-1~517-$n$ of the second resistance control circuit 413A may be identical. For example, in one embodiment, the resistance value of the resistor R1-1 of the first resistance control circuit 411A and the resistance value of the resistor R1-2 of the second resistance control circuit 413A are identical.

In one embodiment, each of the switches SW1-1~SWn-1 included in each of the plurality of the resistance circuits 513-1~513-$n$ of the first resistance control circuit 411A and each of the switches SW1-2~SWn-2 included in each of the plurality of the resistance circuits 517-1~517-$n$ of the second resistance control circuit 413A are switched in response to the each of the control signal CTRL1~CTRLn. For example, the switch SW1-1 and the switch SW1-2 are switched in response to the control signal CTRL1. However, this need not be the case.

Figure 3:
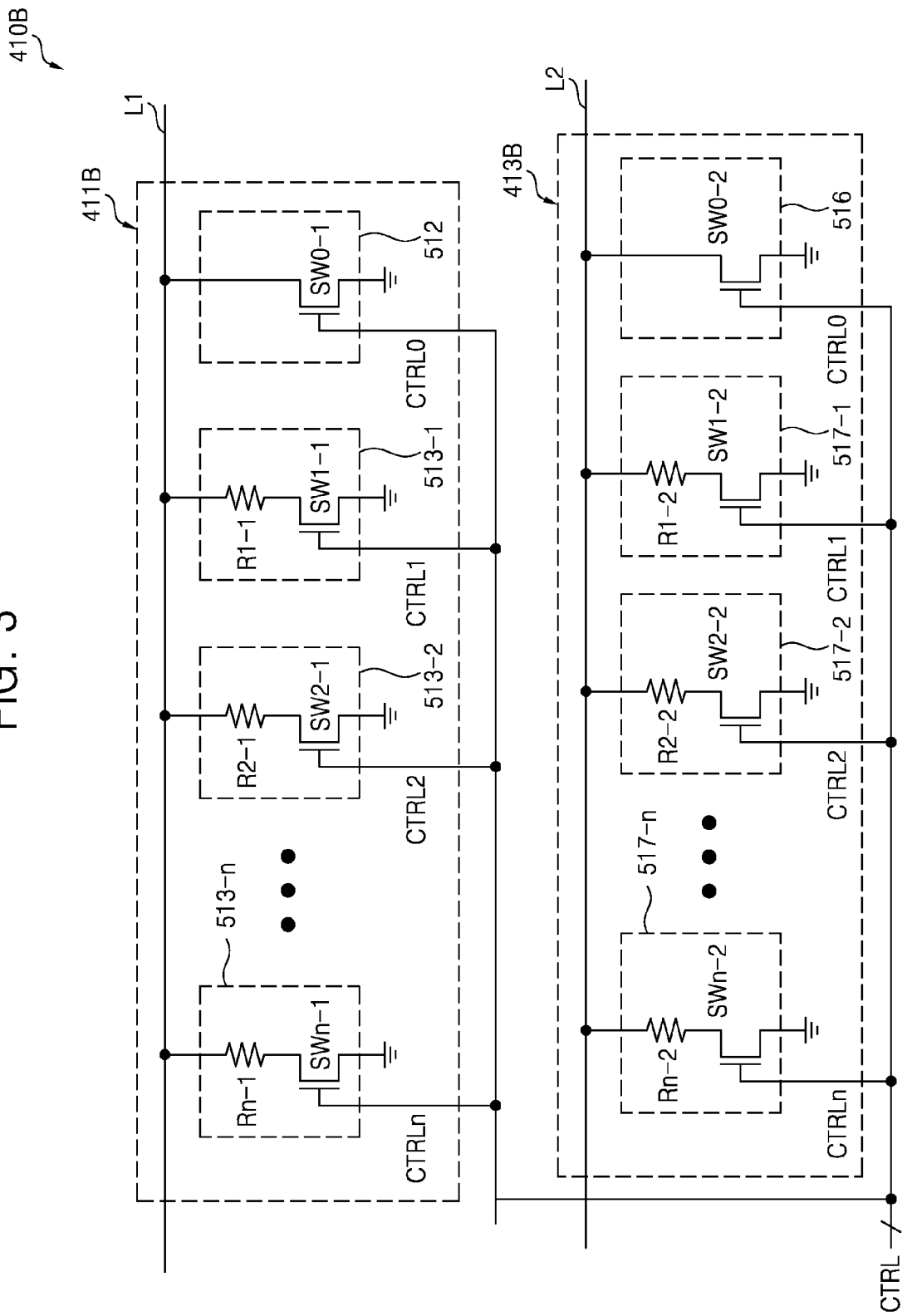
FIG. 3 is another exemplary embodiment of a circuit diagram of the load modulation circuit shown in FIG. 1.

FIG. 3 is another exemplary embodiment of a circuit diagram of the load modulation circuit shown in FIG. 1. Referring to FIGS. 1 and 3, the load modulation circuit 410B includes a first resistance control circuit 411B and a second resistance control circuit 413B.

The first resistance control circuit 411B is connected to a first line L1. The first resistance control circuit 411B controls a resistance value in response to a plurality of control signals CTRL0~CTRLn (collectively, CTRL) output from the processor 500.

The first resistance control circuit 411B includes a plurality of resistance circuits, for example, a first resistance circuit 512 and a plurality of (second) resistance circuits 513-1~513-n, connected between the first line L1 and a ground in parallel.

Each of the first resistance circuit 512 and the plurality of resistance circuits 513-1~513-n is switched in response to a corresponding control signal among the plurality of control signals CTRL output from the processor 500.

The first resistance circuit 512 includes a switch SW0-1 connected between the first line L1 and the ground without a resistor between the switch SW0-1 and the first line L1. The switch SW0-1 is switched in response to a corresponding control signal CTRL0 among the plurality of control signals CTRL output from the processor 500.

The structure and the operation of the resistance circuits 513-1~513-n shown in FIG. 3 and the structure and the operation of the resistance circuits 513-1~513-n shown in FIG. 2 are same, thus descriptions of the same parts are omitted.

The second resistance control circuit 413B is connected to a second line L2. The second resistance control circuit 413B controls a resistance value in response to the plurality of control signals CTRL output from the processor 500.

The second resistance control circuit 413B includes a plurality of resistance circuits, for example, a first resistance circuit 516 and a plurality of (second) resistance circuits 517-1~517-n, connected between the second line L2 and the ground in parallel.

Each of the first resistance circuit 516 and the plurality of resistance circuits 517-1~517-n is switched in response to a corresponding control signal among the plurality of control signals CTRL output from the processor 500.

The first resistance circuit 516 includes a switch SW0-2 connected between the second line L2 and the ground without a resistor between the switch SW0-2 and the second line L2. The switch SW0-2 is switched in response to a corresponding control signal CTRL0 among the plurality of control signals CTRL output from the processor 500.

In one embodiment, the structure and the operation of the resistance circuits 517-1~517-n shown in FIG. 3 and the structure and the operation of the resistance circuits 517-1~517-n shown in FIG. 2 are same, thus, descriptions of the same parts are omitted.

Referring back to FIG. 1, in one embodiment, the signal processing circuit 430 rectifies a received signal and demodulates the rectified signal. The signal processing circuit 430 includes a regulator (not shown) and a demodulator (not shown).

The regulator rectifies a received signal received through each component 100 and 410. According to exemplary embodiments, the regulator may include a bridge circuit.

The demodulator demodulates the rectified received signal and outputs the demodulated received signal as received data RDATA2 to the processor 500.

In one embodiment, the processor 500 communicates with an external NFC device, for example, a NFC reader or a NFC tag through the NFC reader circuit 300 or the NFC card circuit 400. The processor 500 outputs received data RDATA1 received from the NFC reader circuit 300 or received data RDATA2 received from the NFC card circuit 400 to a host (not shown). The processor 500 outputs transmission data TDATA1 received from the host to the NFC reader circuit 300 or a plurality of control signals CTRL related to the transmission of the transmission data TDATA1 to the NFC card circuit 400.

The processor 500 controls the NFC reader circuit 300 and the NFC card circuit 400. According to an exemplary embodiment, the processor 500 controls the NFC reader circuit 300 using a reader enable signal RES. Also, the processor 500 controls the NFC card circuit 400 by using a card enable signal CES.

The processor 500 controls the NFC reader circuit 300 and the NFC card circuit 400 operating selectively by outputting the reader enable signal RES and the card enable signal CES selectively.

The processor 500 outputs the plurality of control signals CTRL to the NFC card circuit 400 while the NFC reader circuit 300 is enabled, for example, while the reader enable signal RES is output (e.g., while the NFC reader circuit is in an enable state). At this time, the NFC card circuit 400 controls a resonant frequency of the antenna 100 in response to the plurality of control signals CTRL.

In detail, in certain embodiments, the processor 500 outputs the plurality of control signals CTRL so as to close (e.g., turn on) a part or all of the switches included in the load modulation circuit 410 while the NFC reader circuit 300 transmits transmission TDATA1 to the outside.

On the contrary, the processor 500 outputs the plurality of control signals CTRL so as to open (e.g., turn off) all of the switches included in the load modulation circuit 410 while the NFC reader circuit 300 receives receiving data RDATA1 from the outside.

In one embodiment, when all of the switches SW0-1~SWn-1 and SW0-2~SWn-2 included in the load modulation circuit 410 are open, a resonant frequency f1 of the antenna 100 may be shown as the following equation 1;

$$f1 = \frac{1}{2\pi \sqrt{Ls \cdot \left(Cp + \frac{Cc \cdot Cpar}{Cc + Cpar}\right)}}, \quad \text{[Equation 1]}$$

where Ls denotes inductance of the antenna 100, Cp denotes capacitance of the resonance circuit 210, Cc denotes capacitance of the capacitor C, and Cpar denotes parasitic capacitance of the NFC circuit 10.

On the other hand, when the switches SW0-1 and SW0-2 are closed, a resonant frequency f2 of the antenna 100 may be shown as the following equation 2;

$$f2 = \frac{1}{2\pi \sqrt{Ls \cdot (Cp + Cc)}}. \quad \text{[Equation 2]}$$

Similarly, the resonant frequency of the antenna 100 may be different from the resonant frequency f1 of when all of the switches SW0-1~SWn-1 and SW0-2~SWn-2 are open, when a part or all of the switches SW0-1~SWn-1 and SW0-2~SWn-2 included in the load modulation circuit 410 are closed. As such, the resonant frequency of the antenna 100 may be selectively controlled.

In addition, a current path from the lines L1 and L2 to the ground may be generated when the switches SW0-1 and SW0-2 included in the load modulation circuit 410 are closed. The current path may block a leakage current generated when the NFC reader circuit 300 transmits transmission data TDATA1 to outside so that a leakage current does not flow to the NFC card circuit 400, for example, to the signal processing circuit 430.

As such, in response to the control signals CTRL, the load modulation circuit 410 disconnects connection between the signal processing circuit 430 and the nodes ND1 and ND2 when the NFC reader circuit 300 transmits data, and connects the signal processing circuit 430 and the nodes ND1 and ND2 when the NFC reader circuit 300 receives data.

Figure 4:
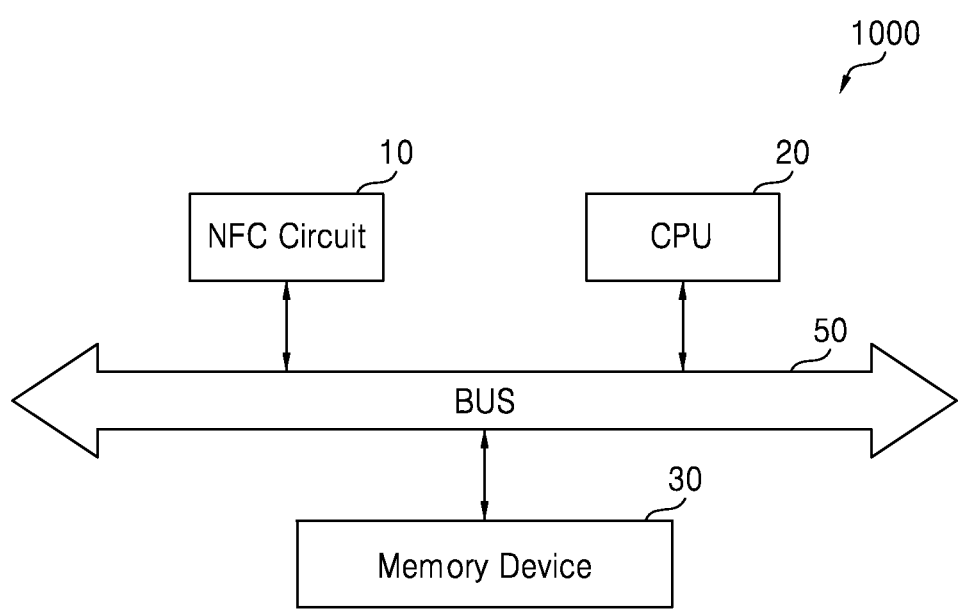
FIG. 4 is a schematic block diagram of an electronic device including the NFC circuit shown in FIG. 1, according to one exemplary embodiment.

FIG. 4 is a schematic block diagram of an electronic device including the NFC circuit shown in FIG. 1, according to one exemplary embodiment.

The electronic device 1000 of FIG. 4 may include different kinds of electronic devices including the NFC circuit 10. For example, the electronic device 1000 may denote a portable computer, tablet personal computer, mobile phone, smart phone, or personal digital assistant (PDA) including the NFC circuit 10.

The electronic device 1000 includes a central processing unit (CPU) 20 for controlling an operation of the NFC circuit 10. Each of components 10, 20, and 30 communicates with each other through a bus 50.

The electronic device 1000 includes a memory device 30 storing data received from the NFC circuit 10 under the control of the CPU 20. The memory device 30 may be embodied, for example, in a non-volatile memory device. The non-volatile memory device includes a plurality of non-volatile memory cells.

Each of the non-volatile memory cells may be embodied, for example, in Electrically Erasable Programmable Read-Only Memory (EEPROM), flash memory, Magnetic RAM (MRAM), Spin-Transfer Torque MRAM, Conductive bridging RAM (CBRAM), Ferroelectric RAM (FeRAM), Phase change RAM (PRAM), Resistive RAM (RRAM or ReRAM), Nanotube RRAM, Polymer RAM, Nano Floating Gate Memory (NFGM), holographic memory, Molecular Electronics Memory Device, or Insulator Resistance Change Memory.

Figure 5:
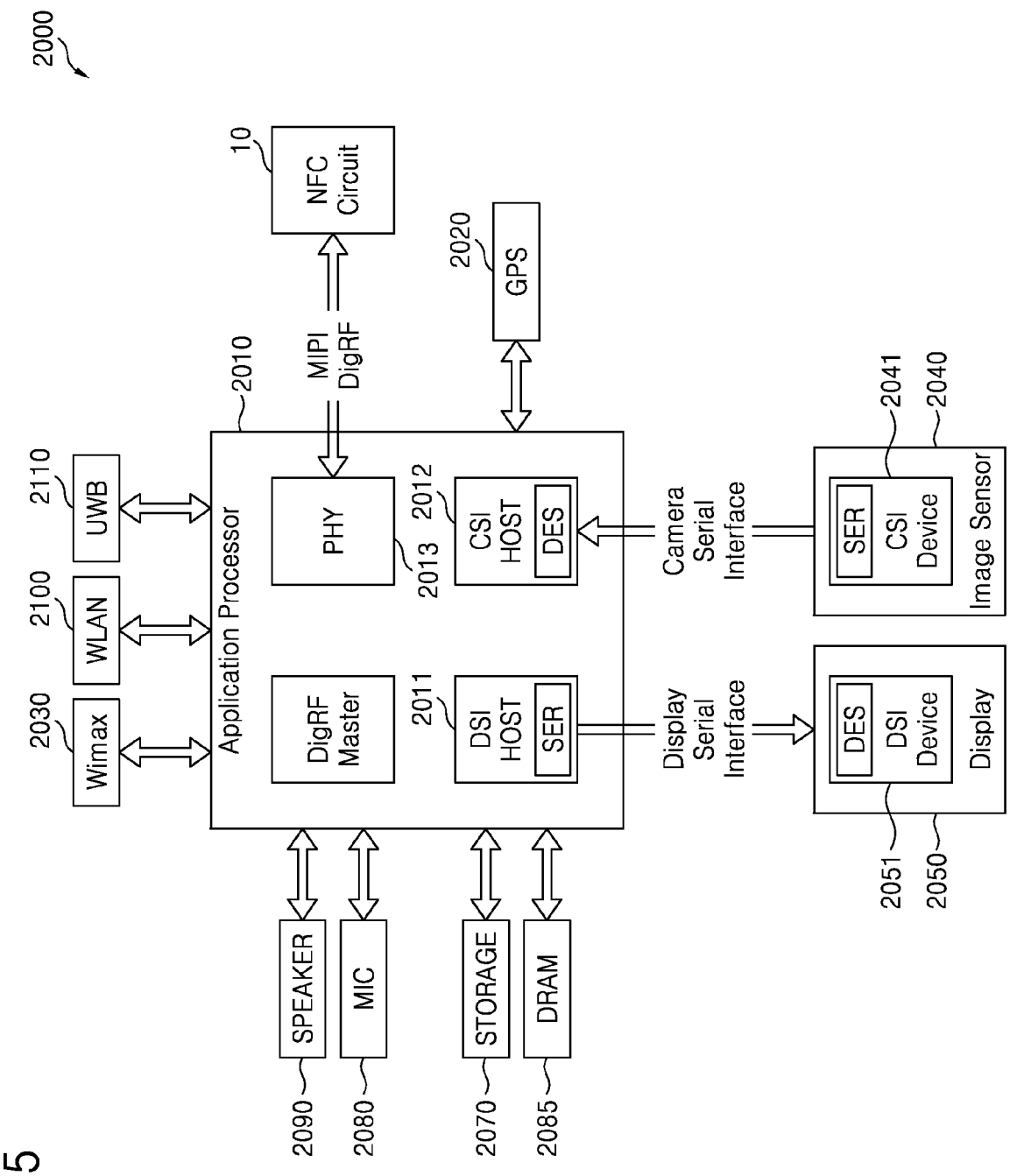
FIG. 5 is a schematic block diagram of an electronic system and interfaces including the NFC circuit shown in FIG. 1, according to one exemplary embodiment.

FIG. 5 is a schematic block diagram of an electronic system comprising the NFC circuit shown in FIG. 1 and interfaces, according to one exemplary embodiment. Referring to FIG. 5, the electronic system 2000 may be embodied in a data processing apparatus capable of using or applying MIPI® interface, for example, mobile phone, PDA, portable multimedia player (PMP), internet protocol (IP) IPTV, or smart phone.

The electronic system 2000 includes an application processor (AP) 2010, an image sensor 2040, and a display (2050).

A CSI host 2012 embodied in the AP 2010 performs serial communication with a CSI device 2041 of the image sensor 2040 through a camera serial interface (CSI). For example, a deserializer DES may be embodied in the CSI host 2012, and a serializer SER may be embodied in the CSI device 2041.

The DSI host 2011 embodied in the application processor 2010 performs serial communication with a DSI device 2051 of a display 2050 through a display serial interface (DSI). A serializer (SER) may be embodied in the DSI host 2011, and a deserializer (DES) may be embodied in the DSI device 2051.

The electronic system 2000 includes the NFC circuit 10 communicating with the AP 2010. In one embodiment, a physical layer (PHY) 2013 and the NFC circuit 10 exchange data according to MIPI Dig RF.

The electronic system 2000 may further include a GPS receiver 2020, a storage 2070, a microphone 2080, a dynamic random access memory (DRAM) 2085, and a speaker 2090, and in one embodiment, the electronic system 2000 communicates by using a Wimax 2030, a WLAN 2100, and/or a UWB 2110.

FIG. 6 is a flow chart for explaining an exemplary operating method of the NFC circuit shown in FIG. 1, according to one embodiment. Referring to FIGS. 1 and 6, the processor 500 outputs a plurality of control signals CTRL to a NFC card circuit 400 while a NFC reader circuit 300 is enabled.

When the NFC reader circuit 300 transmits transmission data to an outside, the processor 500 generates a plurality of control signals CTRL to disconnect connection between a signal processing circuit 410 of the NFC card circuit 400 and lines L1 and L2 (S110). For example, each control signal may be a logic high or logic low signal input to a gate of a transistor, as shown, for example, in FIGS. 2 and 3.

The NFC card circuit 400, for example, the load modulation circuit 410 of the NFC card circuit 400, blocks connection between the signal processing circuit 410 and the lines L1 and L2 by connecting the lines L1 and L2 to the ground in response to the plurality of control signals CTRL (S120).

When the NFC reader circuit 300 receives data from the outside, the processor 500 generates a plurality of control signals CTRL to connect the NFC card circuit 400, for example, the signal processing circuit 410, with the lines L1 and L2.

The NFC card circuit 400, for example, the load modulation circuit 410, connects the signal processing circuit 410 to the lines L1 and L2 by blocking (or disconnecting) the connection between the lines L1 and L2 and the ground in response to the plurality of control signals CTRL (S140).

In one embodiment, when the NFC reader circuit 300 transmits transmission data to the outside, a resonant frequency f2 of the antenna 100 is determined by the equation 2. When the NFC reader circuit 300 receives receiving data from the outside, a resonant frequency f1 of the antenna 100 is determined by the equation 1. Accordingly, the NFC reader circuit 300 communicates with the outside by using different resonant frequencies. The different resonant frequencies used may be changed or adjusted based on the control signals CTRL.

The NFC circuit and the method for operating the same according to certain exemplary embodiments described herein have an effect of controlling a resonant frequency of the NFC circuit by using a load modulation circuit included in the NFC card circuit. Also, the NFC circuit and the method for operating the same have an effect of protecting the NFC card circuit by shutting off leakage current output from the NFC reader circuit with the load modulation circuit included in the NFC card circuit.

While this disclosure has been described with reference to exemplary embodiments, it will be apparent to those skilled in the art that various changes and modifications may be made without departing from the spirit and scope of the disclosed embodiments. Therefore, it should be understood that the above embodiments are not limiting, but illustrative.

What is claimed is:

1. A near field communication (NFC) circuit comprising:
an NFC reader circuit configured to communicate with an outside through an antenna, wherein the NFC reader circuit is coupled to nodes of the antenna;
an NFC card circuit coupled to the nodes and configured to communicate with the outside through the antenna; and
a processor configured to output a plurality of control signals while the NFC reader circuit is enabled,
wherein the NFC card circuit includes a load modulation circuit configured to control a resistance value to control a resonant frequency of the antenna in response to the plurality of control signals while the NFC reader circuit is enabled.

2. The NFC circuit of claim 1, wherein:
the NIT card circuit comprises a signal processing circuit configured to rectify a signal received through the antenna and demodulate the rectified received signal.

3. The NFC circuit of claim 2, wherein the load modulation circuit is configured to shut off connection between the signal processing circuit and the nodes when the NFC reader circuit transmits data to the outside, and to connect the signal processing circuit to the nodes when the NFC reader circuit receives data from the outside.

4. The NFC circuit of claim 2, wherein the load modulation circuit includes a plurality of resistance control circuits configured to control resistance values in response to the plurality of control signals, respectively.

5. The NFC circuit of claim 4, wherein each of the plurality of resistance control circuits includes a plurality of resistance circuits which are connected between a corresponding node among the nodes and a ground in parallel and are configured to be switched in response to the plurality of control signals, respectively.

6. The NFC circuit of claim 5, wherein each of the plurality of resistance circuits comprises:
a first resistance circuit that is switched in response to a first of the plurality of control signals; and
a plurality of second resistance circuits switched in response to a plurality of additional respective control signals among the plurality of control signals.

7. The NFC circuit of claim 2, wherein controlling the resonant frequency includes changing the resonant frequency by a first amount in response to a first setting of the plurality of control signals, and changing the resonant frequency by a second amount different from the first amount in response to a second setting of the plurality of control signals.

8. The NFC circuit of claim 1, wherein the NFC card circuit, the NFC reader circuit, and the processor are embodied in one chip.

9. An electronic device comprising:
the NFC circuit of claim 1; and
a central processing unit (CPU) controlling an operation of the NFC circuit.

10. A method for operating an NFC circuit including an NFC reader circuit and an NFC card circuit, the method comprising:
enabling the NFC reader circuit;
generating a plurality of control signals while the NFC reader circuit is enabled;
providing the plurality of control signals to the NFC card circuit while the NFC reader circuit is enabled; and
selectively controlling a resonant frequency of an antenna using a load modulation circuit of the NFC card circuit, the load modulation circuit configured to control a resistance value to control the resonant frequency in response to the plurality of control signals while the NFC reader circuit is enabled.

11. The method of claim 10, wherein selectively controlling the resonant frequency includes changing the resonant frequency by a first amount in response to a first setting of the plurality of control signals, and changing the resonant frequency by a second amount different from the first amount in response to a second setting of the plurality of control signals.

12. The method of claim 10, wherein selectively controlling the resonant frequency comprises changing a resonant frequency by a first amount when the NFC reader circuit transmits data to an outside and changing the resonant frequency by a second amount different from the first amount when the NFC reader circuit receives data from the outside.

13. The method of claim 10, wherein selectively controlling the resonant frequency comprise for the NFC reader circuit shutting off a connection between the antenna and the NFC card circuit when the NFC reader circuit transmits data and connecting the antenna and the NFC card circuit when the NFC reader circuit receives data.

14. The method of claim 10, wherein the resistance value is associated with the NFC card circuit.

15. A near-field communication (NFC) circuit comprising:
an antenna;
an NFC reader circuit coupled to the antenna;
an NFC card circuit coupled to the antenna;
a resonance circuit;
a processor; and
a control circuit of the NFC card circuit and included in a load modulation circuit of the NFC card circuit, the control circuit configured to receive a control signal from the processor and together with the resonance circuit to control a resistance value to adjust a resonant frequency of the antenna in response to the control signal while the NFC reader circuit is enabled.

16. The NFC circuit of claim 15, wherein:
the NFC reader circuit is coupled to the antenna through the resonance circuit and a matching circuit; and
the NFC card circuit is coupled to the antenna through a first and second line, the first line coupled to a first capacitor, and the second line coupled to a second capacitor.

17. The NFC circuit of claim 15, wherein:
the control circuit includes a plurality of switches configured to disconnect part of the NFC card circuit from the antenna.

18. The NFC circuit of claim 17, wherein the plurality of switches are connected to receive the control signal and to disconnect part of the NFC card circuit from the antenna in response to the control signal.

19. The NFC circuit of claim 15, wherein the NFC card circuit, the NFC reader circuit, and the processor are embodied in one chip.

20. The NFC circuit of claim 15, wherein the control circuit is configured to adjust the resonant frequency by a first amount in response to a first setting of the control signal, and to adjust the resonant frequency by a second amount different from the first amount in response to a second setting of the control signal.

* * * * *